(12) United States Patent
Boivin

(10) Patent No.: US 10,266,216 B2
(45) Date of Patent: Apr. 23, 2019

(54) TRACK SYSTEM HAVING ANTI-DIVING FLAPS

(71) Applicant: Denis Boivin, Beaumont (CA)

(72) Inventor: Denis Boivin, Beaumont (CA)

( * ) Notice: Subject to any disclaimer, the term of this patent is extended or adjusted under 35 U.S.C. 154(b) by 148 days.

(21) Appl. No.: 15/433,358

(22) Filed: Feb. 15, 2017

(65) Prior Publication Data

US 2017/0158267 A1 Jun. 8, 2017

Related U.S. Application Data

(63) Continuation-in-part of application No. 14/878,538, filed on Oct. 8, 2015, now Pat. No. 9,688,323, which is a continuation of application No. PCT/CA2014/050223, filed on Mar. 12, 2014, which is a continuation of application No. 13/861,883, filed on Apr. 12, 2013, now Pat. No. 8,776,931, which is (Continued)

(51) Int. Cl.

| | | |
|---|---|---|
| *B62D 55/04* | (2006.01) | |
| *B62D 55/084* | (2006.01) | |
| *B62D 55/088* | (2006.01) | |
| *B62D 55/12* | (2006.01) | |
| *B62D 55/24* | (2006.01) | |
| *B62D 55/14* | (2006.01) | |

(52) U.S. Cl.
CPC .......... *B62D 55/084* (2013.01); *B62D 55/04* (2013.01); *B62D 55/088* (2013.01); *B62D 55/12* (2013.01); *B62D 55/14* (2013.01); *B62D 55/24* (2013.01)

(58) Field of Classification Search
CPC ........ B62D 55/04; B62D 55/02; B62D 55/00; B62D 55/084; B62D 55/0845; B62D 55/065; B62D 55/088; B62D 55/12; B62M 27/02; B62M 2027/021; B62M 2027/022

USPC ....................... 180/180, 181, 198, 9.21, 9.26
See application file for complete search history.

(56) References Cited

U.S. PATENT DOCUMENTS

| | | |
|---|---|---|
| 881,008 A | 3/1908 | Knut |
| 916,601 A | 3/1909 | Roberts et al. |
| 1,031,174 A | 7/1912 | Fregoso |

(Continued)

FOREIGN PATENT DOCUMENTS

| | | |
|---|---|---|
| AU | 1853100 A | 8/2000 |
| CA | 2260192 | 7/2000 |

(Continued)

*Primary Examiner* — Anne Marie M Boehler
(74) *Attorney, Agent, or Firm* — Norton Rose Fulbright Canada LLP; Alexandre Daoust

(57) ABSTRACT

The track system has four track assemblies each mounted to a corresponding driving axle of a vehicle to receive driving power therefrom, each track assembly having: a plurality of transversally-oriented track roller shafts mounted to a frame structure, parallel to one another and interspaced from one another from including two end roller shafts each at a corresponding opposite longitudinal end; an endless track belt having an outer surface and an inner surface, the endless track belt being longitudinally oriented and wrapping the track roller shafts; an anti-diving flap having a flat body protruding upwardly and longitudinally from one longitudinal end of the endless track belt, the anti-diving flap having two structural arms, each structural arm extending around the endless track belt on a respective transversal side thereof and being secured to the frame structure.

14 Claims, 12 Drawing Sheets

Related U.S. Application Data a continuation-in-part of application No. 12/763,666, filed on Apr. 20, 2010, now abandoned.

(56) References Cited

U.S. PATENT DOCUMENTS

| | | |
|---|---|---|
| 1,038,569 A | 9/1912 | Grover |
| 1,062,318 A | 5/1913 | Berlin |
| 1,112,460 A | 10/1914 | Leavitt |
| 1,117,640 A | 11/1914 | Coon |
| 1,214,437 A | 1/1917 | D'Agostino |
| 1,228,687 A | 6/1917 | Miller |
| 1,404,052 A * | 1/1922 | Palm ............... B62M 27/02 180/185 |
| 1,446,292 A | 2/1923 | George |
| 1,453,782 A | 5/1923 | Bell |
| 1,545,264 A * | 7/1925 | Logan ............... B62M 27/02 180/185 |
| 1,636,828 A | 7/1927 | Neighbour |
| 1,774,835 A | 9/1930 | Lombard |
| 1,794,985 A | 3/1931 | Ruth |
| 2,461,850 A | 2/1949 | Slemmons |
| 2,467,947 A | 4/1949 | Skelton |
| 2,496,136 A | 1/1950 | Smith |
| 2,556,270 A | 6/1951 | Groeller |
| 2,573,728 A | 11/1951 | Pugh |
| 2,782,076 A | 2/1957 | Miller |
| 2,899,242 A | 8/1959 | Bombardier |
| 3,050,347 A | 8/1962 | Levi |
| 3,306,175 A | 2/1967 | Ferwerda |
| 3,412,821 A | 11/1968 | Humphrey |
| 3,443,844 A | 5/1969 | Schoonover |
| 3,447,621 A | 6/1969 | Schoonover |
| 3,561,825 A | 2/1971 | Gibson et al. |
| 3,565,493 A | 2/1971 | Chaumont |
| 3,582,155 A | 6/1971 | Marier et al. |
| 3,590,935 A | 7/1971 | Celia |
| 3,596,727 A | 8/1971 | Graham |
| 3,598,454 A | 8/1971 | Richards |
| 3,688,858 A | 9/1972 | Jespersen |
| 3,841,424 A | 10/1974 | Purcell et al. |
| 3,885,641 A | 5/1975 | Harris |
| 3,894,778 A | 7/1975 | Siorek et al. |
| 3,926,272 A | 12/1975 | Weber |
| 3,938,606 A | 2/1976 | Yancey |
| 3,960,229 A | 6/1976 | Shio |
| 4,121,788 A | 10/1978 | McMahon |
| 4,194,584 A | 3/1980 | Kress et al. |
| 4,232,753 A | 11/1980 | Carlson |
| 4,244,436 A | 1/1981 | Condon et al. |
| 4,337,958 A | 7/1982 | Witt et al. |
| 4,378,133 A | 3/1983 | Trautwein |
| 4,407,550 A | 10/1983 | Lapsys |
| 4,415,055 A | 11/1983 | Ahn |
| 4,483,407 A | 11/1984 | Iwamoto et al. |
| 4,488,616 A | 12/1984 | Harris |
| 4,534,437 A | 8/1985 | Howerton et al. |
| 4,613,006 A | 9/1986 | Moss et al. |
| 4,714,302 A | 12/1987 | Svensson et al. |
| 4,826,184 A | 5/1989 | Kuehmichel et al. |
| 5,054,798 A | 10/1991 | Zulawski |
| 5,064,208 A | 11/1991 | Bibollet |
| 5,240,084 A * | 8/1993 | Christianson ...... B62D 49/0635 180/9.1 |
| 5,251,718 A | 10/1993 | Inagawa et al. |
| 5,340,205 A | 8/1994 | Nagorcka |
| 5,344,371 A | 9/1994 | Wang |
| 5,474,146 A | 12/1995 | Yoshioka et al. |
| 5,515,936 A | 5/1996 | Lagacé |
| 5,518,080 A | 5/1996 | Pertile |
| 5,568,840 A | 10/1996 | Nagata et al. |
| 5,607,210 A | 3/1997 | Brazier |
| 5,655,615 A | 8/1997 | Mick |
| 5,713,645 A | 2/1998 | Thompson et al. |
| 5,730,510 A | 3/1998 | Courtemanche |
| 5,938,301 A | 8/1999 | Hostetler et al. |
| 5,954,148 A | 9/1999 | Okumura et al. |
| 5,957,230 A | 9/1999 | Harano et al. |
| 5,967,630 A | 10/1999 | Sewell |
| 5,984,032 A | 11/1999 | Gremillion et al. |
| 5,996,717 A | 12/1999 | Hisadomi |
| 6,006,847 A | 12/1999 | Knight |
| 6,007,166 A | 12/1999 | Tucker et al. |
| 6,095,275 A | 8/2000 | Shaw |
| 6,101,953 A | 8/2000 | Spata |
| 6,109,705 A | 8/2000 | Courtemanche |
| 6,112,840 A * | 9/2000 | Forbes ............... B62K 3/002 180/191 |
| 6,129,426 A | 10/2000 | Tucker |
| 6,132,287 A | 10/2000 | Kuralt et al. |
| 6,199,646 B1 | 3/2001 | Tani et al. |
| 6,203,125 B1 | 3/2001 | Arakawa et al. |
| 6,234,263 B1 | 5/2001 | Boivin et al. |
| 6,283,562 B1 | 9/2001 | Tsubota et al. |
| 6,318,484 B2 | 11/2001 | Lykken et al. |
| 6,505,896 B1 | 1/2003 | Boivin et al. |
| 6,543,862 B1 | 4/2003 | Kahle et al. |
| 6,626,258 B1 | 9/2003 | Forbes |
| 6,659,214 B1 | 12/2003 | Laing |
| 6,848,757 B2 | 2/2005 | Ueno |
| 6,904,986 B2 | 6/2005 | Brazier |
| 7,131,508 B2 | 11/2006 | Brazier |
| 7,182,165 B1 | 2/2007 | Keinath et al. |
| 7,198,337 B2 | 4/2007 | Deckler et al. |
| 7,219,968 B2 | 5/2007 | Hisamatsu |
| 7,416,266 B2 | 8/2008 | Soucy et al. |
| D612,766 S | 3/2010 | Boivin |
| 7,832,814 B2 | 11/2010 | Breton |
| 8,136,827 B2 | 3/2012 | Lumpkin |
| 8,613,332 B2 * | 12/2013 | Zakuskin ............... B62D 55/04 180/9.26 |
| 8,695,735 B2 * | 4/2014 | Afanador ............... B62D 55/04 180/7.1 |
| 9,688,323 B2 * | 6/2017 | Boivin ............... B62D 55/12 |
| 2002/0005665 A1 | 1/2002 | Ito et al. |
| 2003/0159859 A1 | 8/2003 | Boivin et al. |
| 2003/0159860 A1 | 8/2003 | Boivin et al. |
| 2005/0133281 A1 | 6/2005 | Boivin et al. |
| 2006/0060395 A1 | 3/2006 | Boivin et al. |
| 2008/0174176 A1 | 7/2008 | Berg |
| 2011/0254363 A1 | 10/2011 | Boivin |
| 2016/0075384 A1 * | 3/2016 | Mattson ............... B62D 55/084 305/131 |

FOREIGN PATENT DOCUMENTS

| | | |
|---|---|---|
| CA | 2281341 | 3/2001 |
| CA | 2317223 | 3/2001 |
| CA | 2372949 | 8/2003 |
| CA | 2388294 | 8/2003 |
| CA | 2509440 | 12/2005 |
| CA | 2617468 | 7/2008 |
| WO | 0043265 | 7/2000 |

* cited by examiner

TRACK SYSTEM HAVING ANTI-DIVING FLAPS

FIELD

This specification relates to all-terrain vehicles and, more particularly to track assemblies engageable with wheels of an all-wheel drive vehicle.

BACKGROUND

In difficult driving conditions (collectively referred to as 'adverse conditions') such as snow, sand, gravel, mud, ice, and the like, wheeled vehicles can have propelling difficulties, and even bog.

Traction (or track) assemblies, or track units, have been developed for converting a wheeled driven vehicle, such as trucks, cars, SUV, all-terrain vehicles, and the like, into a track-like driven vehicle for improved traction in certain types of terrain and driving conditions.

Typically for mounting a track assembly to a wheeled vehicle, the wheels are removed on each axle of the vehicle and are replaced by track assemblies mounted directly to the hub. The installation or removal of the track assemblies is carried out in a specialized facility, which represents significant expenses.

There is thus a need for a track assembly for a wheeled vehicle which is simpler to mount or dismount, and more specifically, that does not require the removal of wheels of the vehicle.

SUMMARY

In accordance with one aspect, there is provided a track system for an all-wheel drive vehicle having a plurality of tires, the track system comprising: a plurality of track assemblies, each removably adaptable to a corresponding tire of the vehicle, each track assembly comprising: a frame structure including two elongated side plates oriented parallel to each other and transversally spaced-apart from each other, the two side plates each having two opposite ends, each opposite end being associated to a corresponding longitudinal end of the track assembly; a tire area located centrally and above the frame structure, where the corresponding tire is to be received and rotated around a wheel axis; a plurality of track roller shafts being parallel to one another and interspaced from one another from one longitudinal end of the track assembly to the other longitudinal end of the track assembly, and including two end roller shafts each associated to a corresponding one of the longitudinal ends of the track assembly; the track roller shafts each having plurality of track rollers interspaced transversally from one another along the track roller shafts, the track rollers of each track roller shaft being longitudinally aligned with corresponding track rollers of the other track roller shafts and forming a plurality of longitudinal sets of track rollers; a track having a web forming a closed loop housing and snugly wrapping the track rollers, the track having guiding members protruding inwardly therefrom, the guiding members being longitudinally aligned with at least one longitudinal spacing defined between the longitudinal sets of track rollers, to transversally guide the track relative the track rollers; an upper sliding surface and a lower sliding surface mounted to the frame structure, extending transversally between the side plates and longitudinally between the end roller shafts, being inwardly offset from the web by a distance associated to a thickness of the guiding members, and being apertured in a manner to allow the track rollers to protrude therefrom to reach the web; two parallel, transversally-oriented drive shafts, each received in the frame structure on a corresponding longitudinal side of the tire area, each having a rotatable drive gear having an apertured and generally cylindrical outer wall drivingly engaged with the track and having at least one open transversal end, the drive gears being collectively engageable with the tire in a manner that the drive gears collaborate in driving the track as the engaged tire rotates; a tension attachment adapted to apply tension between the frame and the wheel axis and to maintain the tire in engagement against both drive gears; each drive gear being associated to at least one corresponding internal scraper secured to the frame and protruding into the hollow through the at least one open transversal end for scraping an internal surface of the cylindrical outer wall, and at least one corresponding external scraper secured to the frame and aligned for scraping an external surface of the cylindrical outer wall; each drive gear being associated to at least one shield closing a generally wedge-shaped space formed between the cylindrical outer wall and the track, adjacent a corresponding one of the end roller shafts; a closure closing a portion of the track extending between the drive gears from the tire area; and two lateral tire supports mounted to the frame structure, each lateral tire support being positioned on a corresponding transversal side of the tire area and rotatably receiving a plurality of tire rollers aligned in a corresponding vertical plane to laterally engage a tire received in the tire area.

In accordance with another aspect, there is provided a track assembly for a motorized vehicle having wheels. The track assembly comprises: a longitudinal track having an outer surface and an inner surface; a frame structure to mount the longitudinal track to the vehicle, the frame structure including at least one driving gear disposed externally to the longitudinal track and configured to frictionally engaged an outer surface of one of the motorized vehicle wheels, the at least one driving gear being drivingly connected with the longitudinal track for transmitting power thereto, each one of the at least one driving gear having a rotation axis, a plurality of elongated traction bars extending substantially parallel and circumferentially to the rotation axis, and apertured ends, the elongated traction bars being spaced-apart from one another and defining therebetween channels allowing granular and liquid materials to flow inwardly towards the rotation axis, and outwardly of the at least one driving gear through the apertured ends; and inner wheels in contact with the inner surface of the longitudinal track.

In an embodiment, the frame structure comprises two drive gears located respectively forwardly and rearwardly of the engageable motorized vehicle wheel and the apertured ends extending radially from the rotation axis.

In an embodiment, the at least one driving gear is drivingly connected through meshed linkages with the longitudinal track for transmitting power thereto without slippage.

The longitudinal track can rotate in the rotational direction of the motorized vehicle wheel when actuated.

In an embodiment, the frame structure comprises two spaced-apart lateral tire supports including rollers for receiving the vehicle wheel therebetween and being mounted externally of the longitudinal track. The distance between the lateral tire supports can be adjustable.

In accordance with another aspect, there is provided a motorized vehicle including four detachable track assemblies to support the vehicle onto a ground surface and having four wheels, each one of the track assemblies comprising: a frame; a longitudinal track movably mounted to the frame; inner wheels rotatably mounted to the frame and in contact with an inner surface of the longitudinal track; at least two drive gears disposed externally to the longitudinal track and being in frictional driving engagement with one of the four motorized vehicle wheels for rotation therewith, located above the longitudinal track and drivingly connected to the track for transmitting motion thereto, each one of the drive gears having a central rotation axis with a plurality of elongated traction bars extending substantially parallel and circumferentially to the central rotation axis, the elongated traction bars being radially spaced-apart from the rotation axis and from one another.

In an embodiment, the drive gears have open ends and/or are drivingly meshed with the longitudinal track.

In accordance with still another aspect, there is provided a driving gear for transferring power from a vehicle wheel to a track of a vehicle track assembly, the driving gear comprising a body in the shape of a hollow cylinder having two spaced-apart open ends, a central axle and a plurality of longitudinally oriented, and regularly circumferentially interspaced traction bars defining the cylindrical shape and being adapted for receiving traction from the vehicle wheel, and a plurality of channels interspersed between corresponding ones of the traction bars, the channels being shaped for evacuating snow from the track inside the hollow cylinder and out the two open ends.

In an embodiment, the driving gear comprises a radial support connecting the axle and the traction bars and maintaining the traction bars in a radially spaced-apart relationship and each one of the traction bars having two opposed ends unattached to the axle and thereby defining the open ends of the drive gears.

In an embodiment, the driving gear comprises a plurality of traction bar units, each one of the traction bar units including at least two traction bars, the traction bar units being spaced-apart from one another and defining the interspersed channels therebetween.

In accordance with still another aspect, there is provided a method of mounting at least one vehicle track assembly to a vehicle, the method comprising laying the at least one vehicle track assembly on the ground, attaching at least one ramp to one end of each one of the at least one vehicle track assembly, displacing the vehicle for a wheel thereof to mount the at least one ramp and drop into an operative position in the at least one vehicle track assembly, and removing the at least one ramp.

In an embodiment, the at least one ramp comprises an attachment bar mating and engageable with a channel defined in a driving gear of the at least one track assembly for preventing rotation of the driving gear.

In an embodiment, attaching the at least one ramp comprises inserting a first attachment male member of the at least one ramp in a mating slot of the at least one track assembly and inserting an attachment bar of the at least one ramp in a mating channel defined in a driving gear of the at least one track assembly and between two circumferentially consecutive traction bars of the at least one track assembly for preventing rotation of the driving gear.

In accordance with another aspect, there is provided a track unit kit for a motorized vehicle having a plurality of wheels, the track unit kit comprising: a track assembly including a frame, a longitudinal track movably mounted to the frame, inner wheels rotatably mounted to the frame and in contact with an inner surface of the longitudinal track, and at least two drive gears disposed externally to the longitudinal track, located above the longitudinal track and drivingly connected to the track for transmitting motion thereto, each one of the drive gears having a central rotation axis with a plurality of elongated traction bars extending substantially parallel and circumferentially to the central rotation axis, the elongated traction bars being radially spaced-apart from the rotation axis and from one another for defining channels therebetween; and a ramp for mounting and dismounting the vehicle wheels from the track assembly above the track and between the drive gears, the ramp having an attachment bar mating and engageable with one of the channels defined in the drive gears and preventing rotation of the drive gears during mounting and dismounting the vehicle wheels from the track assembly.

In an embodiment, the frame of the track assembly comprises a slot defined therein and the ramp comprises an attachment male member removably insertable in the slot for attaching the ramp to the track assembly.

DESCRIPTION OF THE DRAWINGS

It will be noted that throughout the appended drawings, like features are identified by like reference numerals.

DETAILED DESCRIPTION

Figure 1:
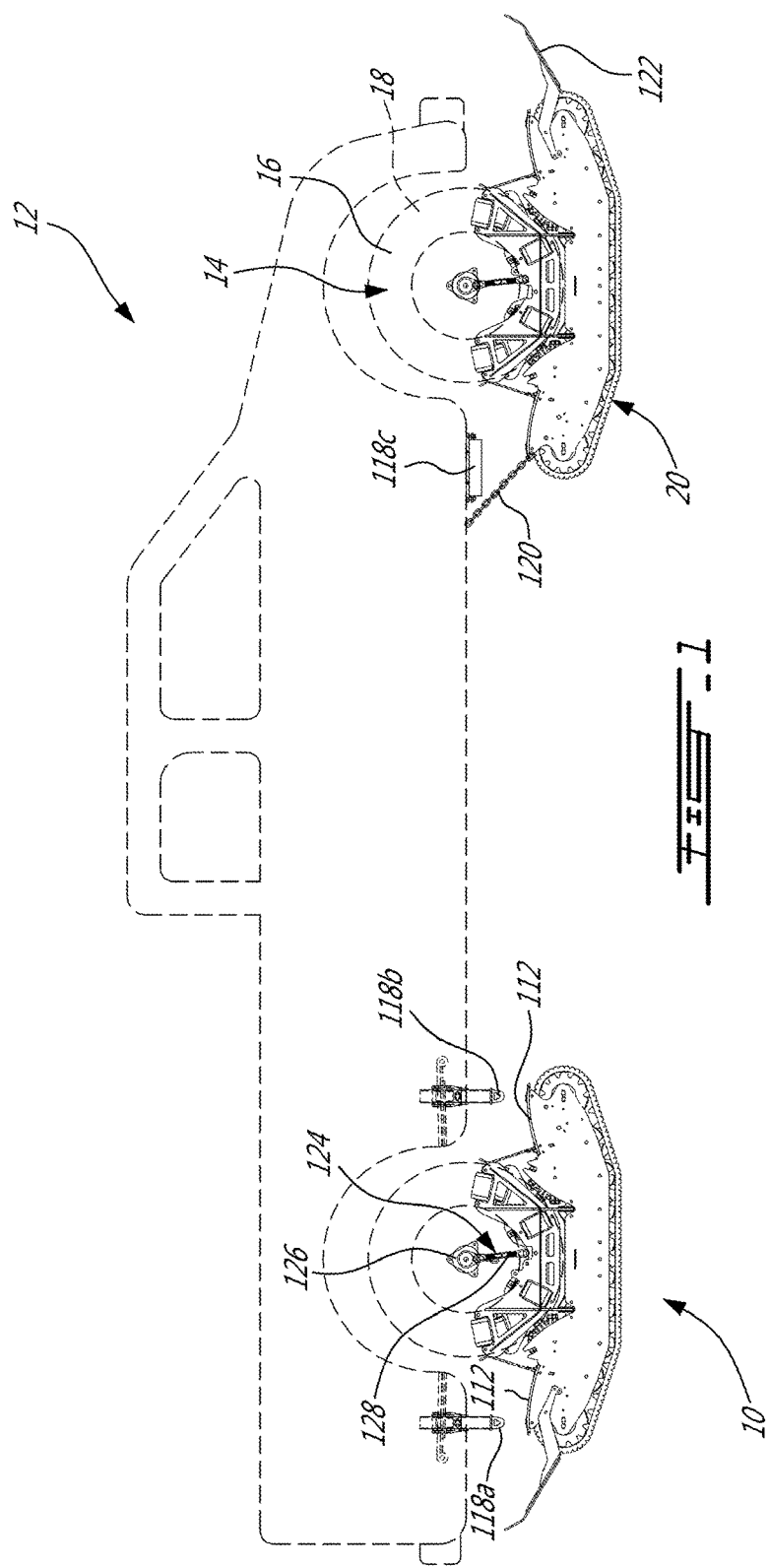
FIG. 1 is a side elevation view of a track system mounted to an all-wheel drive vehicle.

FIG. 1 shows a track system 10 mounted to an all-wheel drive vehicle 12. The track system includes four track assemblies 20. Each track assembly 20 is mounted to a corresponding axle 17 of the all-wheel drive vehicle and receive driving power therefrom. In this embodiment, the track assemblies 20 are mounted without removing the wheels 14 of the vehicle, and are thus driven by the axle 17 via the tire 16. More specifically, tires 16 of the vehicle 12 are received in corresponding tire areas 18 associated to each one of the track assemblies. More particularly, the track system 10 includes four track assemblies 20 (only two are shown), which are identical in this case.

Figure 2:
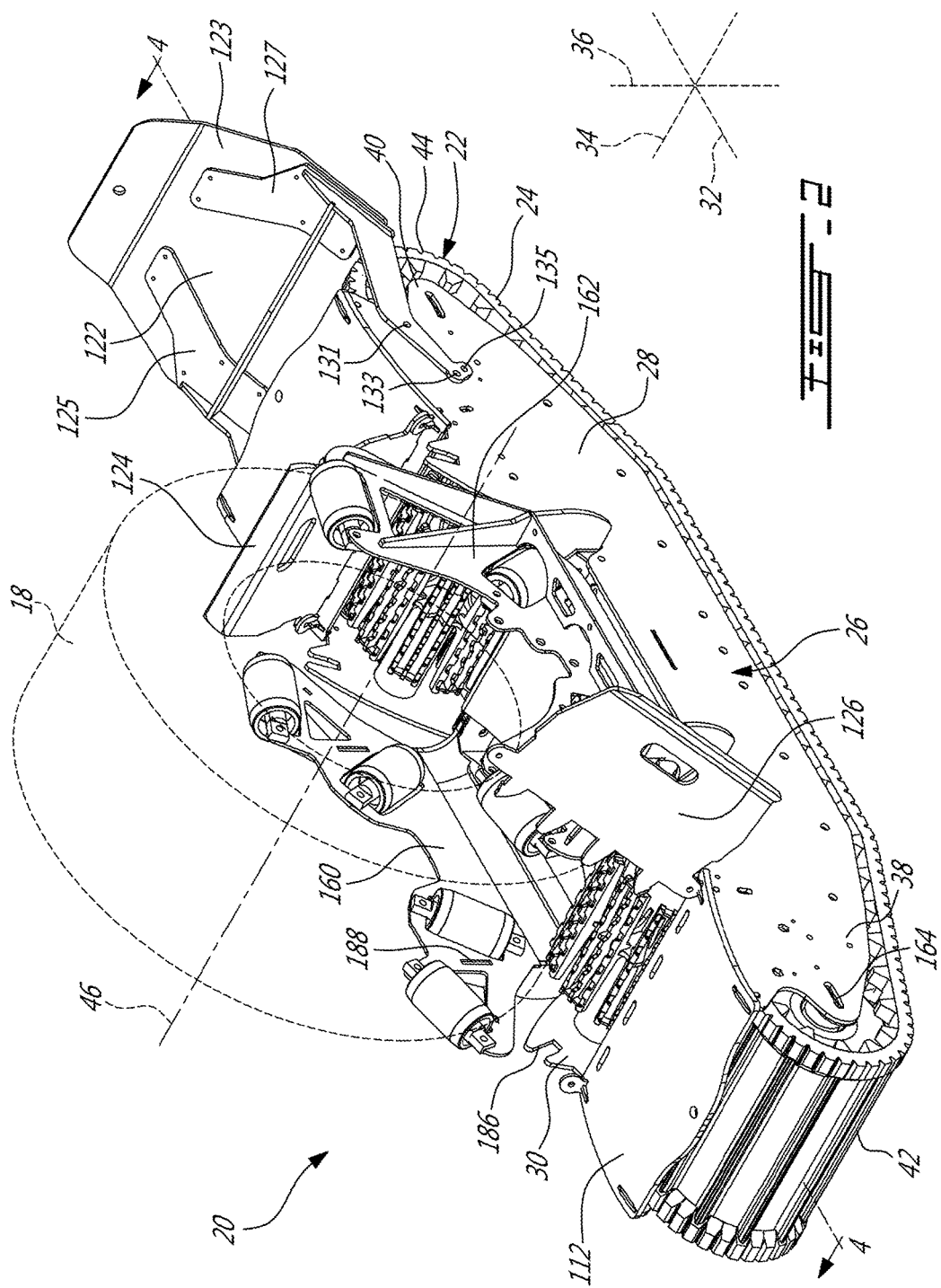
FIG. 2 is an oblique view of a track assembly of the track system of FIG. 1.

One of the track assemblies 20 is shown in greater detail in FIG. 2, where the track assembly 20 includes a track 22 having a web forming a closed loop of an elongated shape, and can be referred to as a longitudinal endless track belt, and a frame structure 26 used to mount the track 22 to the vehicle 12. Henceforth, a longitudinal orientation 32 can be defined as being associated to the vehicle direction during use of the system, whereas a transversal orientation 34 can be defined as being perpendicular to both the longitudinal orientation 32 and the vertical orientation 36 during use of the track system 10 on a horizontal surface. The frame structure 26 includes two elongated side plates 28, 30 oriented parallel to each other and being transversally spaced-apart. As will be detailed below, the side plates 28, 30 receive a plurality of shafts for rotatable components of the track assembly 20. The side plates 28, 30 are elongated and have opposite ends 38, 40 each associated with a corresponding one of the opposite ends 42, 44 of the track assembly 20. The track assembly 20 further includes a tire area 18 located centrally and above the frame structure 26, where the corresponding tire is received. The tire area 18 can be said to have a wheel axis 46 corresponding to the axis of rotation of the tire.

Figure 3:
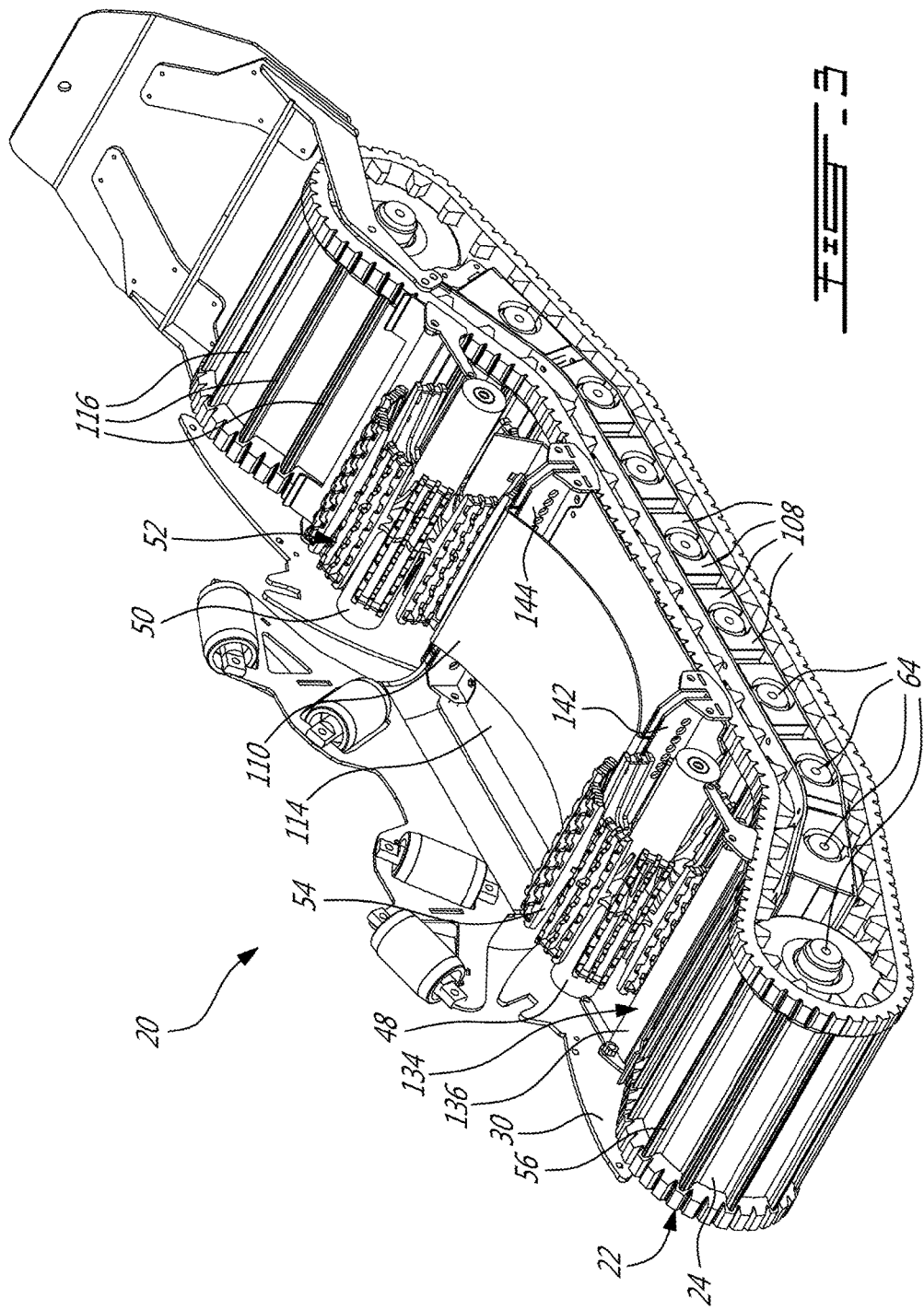
FIG. 3 is another oblique view of the track assembly of FIG. 1, but with components removed.

Turning now to FIG. 3, the track assembly 20 can further be seen to include two parallel, transversally-oriented drive shafts 48, 50, each received in the frame structure 26 on a corresponding longitudinal side of the tire area 18 (i.e. one in the front and the other in the back). Each one of the drive shafts 48, 50 has a rotatable drive gear 52. More specifically, in this specific embodiment, as can be best seen in FIG. 5, the drive shafts 48, 50 are rotatably mounted to the side plates 28, 30, and the drive gear 52 is provided in the form of an apertured, generally cylindrical, outer wall 54 which is engaged with the tread 56 of the track 22 and firmly mounted to the shaft 50 by a central core 58 which leaves the drive gear hollow with two transversally opposite open ends 60, 62. The drive gears 52 are collectively engageable with a tire in the tire area 18 in a manner to collaborate in driving the track as the engaged tire rotates, as can perhaps be best understood by referring to FIG. 4.

Figure 4:
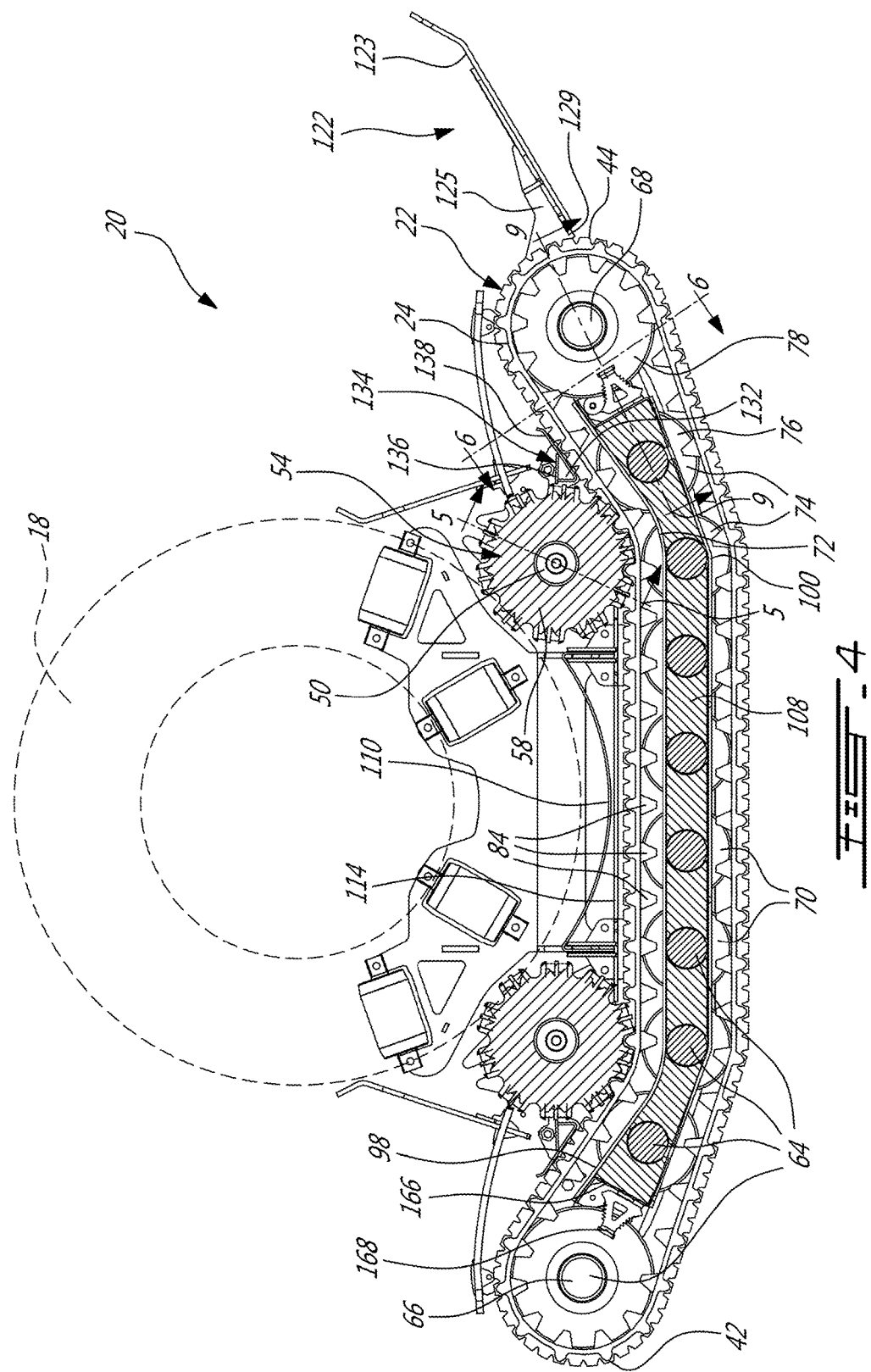
FIG. 4 is a cross-sectional view taken along lines 4-4 of FIG. 2.

Referring to FIG. 3 or 4, the track assembly further includes a plurality of track roller shafts 64 mounted parallel to one another and extending transversally between the side plates 28, 30, and interspaced from one another along the length of the track assembly 20. The track roller shafts 64 can be said to include two end roller shafts 66, 68, one at each end 42, 44 of the track assembly 20. As best seen in FIGS. 4, 7, 8 and 9, each one of the track roller shafts 64 includes a plurality of idling track rollers 70 rotatable with the corresponding track roller shaft 64 and housed inside the closed loop of the track 22.

Referring to FIG. 4, it will be understood that the track 22 is supported by the track rollers 70. Each one of the track rollers 70 has a peripheral portion in contact with the inner surface of the web 24 of the track 22 and rotates therewith. In this embodiment, the track rollers 70 positioned at the track ends 42, 44 have a larger diameter than the track rollers 70 positioned therebetween, as shown in FIG. 4. More particularly, the last and the next-to-last front and rear track roller shafts include track rollers 70 of larger diameter than the track rollers 70 extending therebetween. In this specific embodiment, the ends 42, 44 of the track 22 are upturned due to the raised position of the last and next-to-last track rollers (or more specifically the position of their track roller shafts 64 in the side plates 28, 30), which creates a fold 72 in the track in the region of the drive gear 52. This shape can be favourable to progress in thick snow, and positioning the drive gears 52 in this fold can allow to oppose the drive gears 52 to two adjacent track rollers 74, which can improve power transfer compared to opposing the drive gears 52 to a single track roller. However, folds also typically represent a power loss, requiring greater power move the endless track, and accordingly in this embodiment, the diameter of the next-to-last rollers 76 and the last rollers 78 was selected draw a straight path from the fold 72 arriving tangentially at the periphery of the last rollers 78, thereby avoiding additional folds. For the purpose of providing the details of a functional example, in this specific embodiment, the last rollers 78 are selected with a diameter of 8", the next-to-last rollers 76 are selected with a diameter of 5.7", the other rollers are selected with a diameter of 5 inches, and the distance between the drive gears shafts is of 26"9/16, which provided satisfactory results.

The web 24 of the track snuggly wraps the track rollers 70, collectively. Moreover, referring to FIGS. 6, 7 and 8, it can be seen that the spacing of the rollers 70 along any one of the track roller shafts 64 is arranged in a manner that the track rollers 70 of each track roller shaft 64 is longitudinally aligned with track rollers 70 of the other shafts 64 to form longitudinal sets of track rollers 80, 82 . . . .

Figure 6:
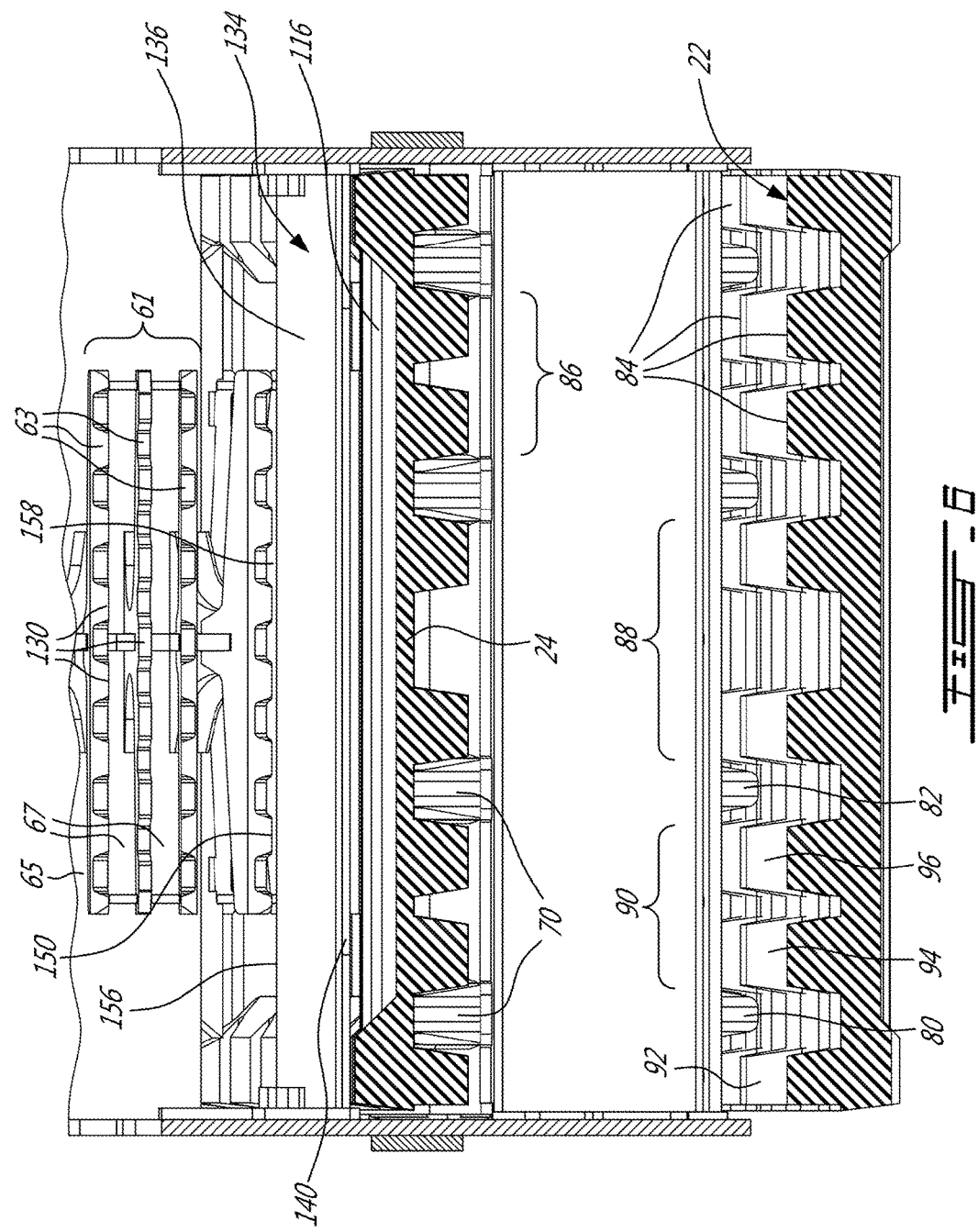
FIG. 6 is a cross-sectional view taken along lines 6-6 of FIG. 4.
Figure 9:
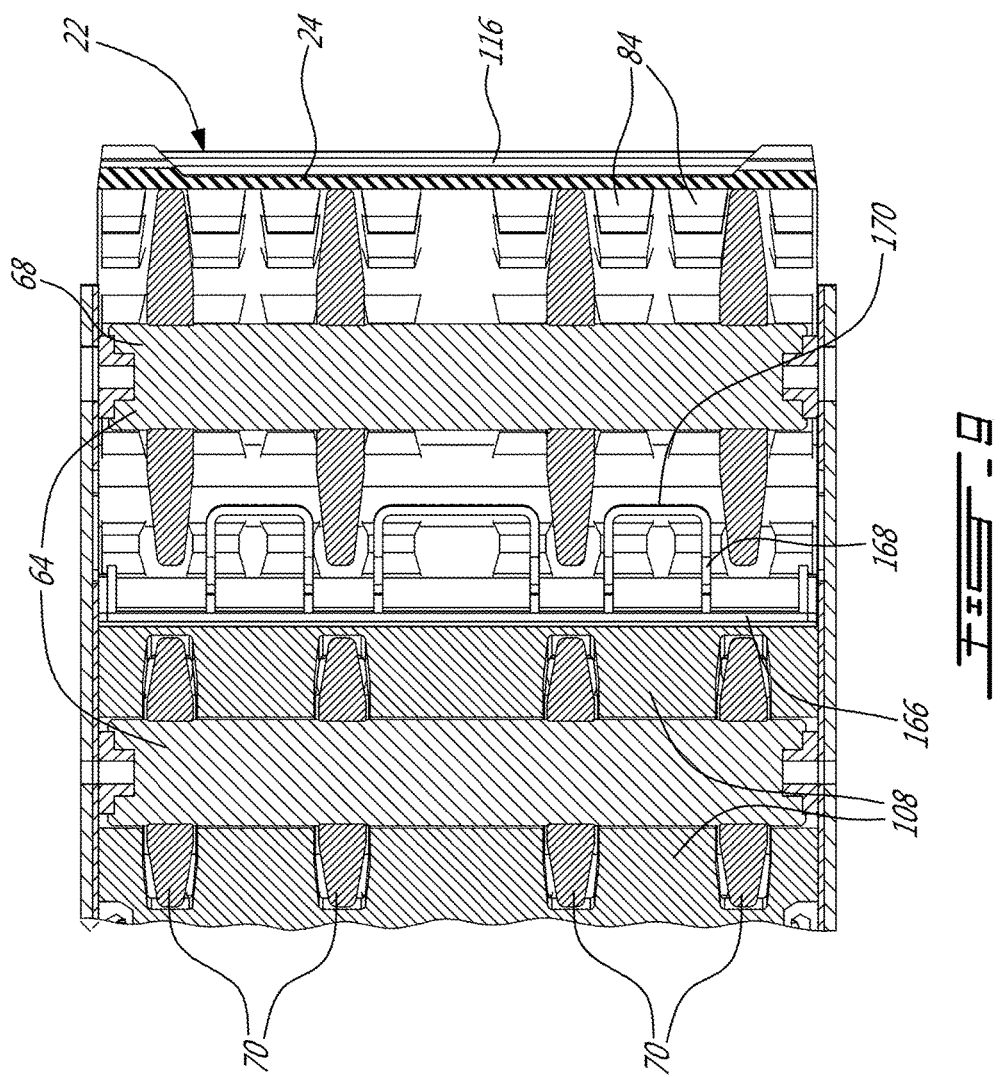
FIG. 9 is a cross-sectional view taken along lines 9-9 of FIG. 4.

As seen in FIGS. 4, 6 and 9, the track 22 has a plurality of inwardly protruding guiding members 84 which mate with spacings 86, 88, 90 formed between the longitudinal sets of track rollers 80, 82 as shown in FIG. 6, and which cooperate with the track rollers 70 in maintaining the transversal alignment of the track 22 with the frame structure 26. More specifically, in this embodiment, a longitudinal set of guiding members 92, 94, 96 . . . is provided immediately adjacent to both sides of each longitudinal set of track rollers 80, 82 . . . .

Figure 7:
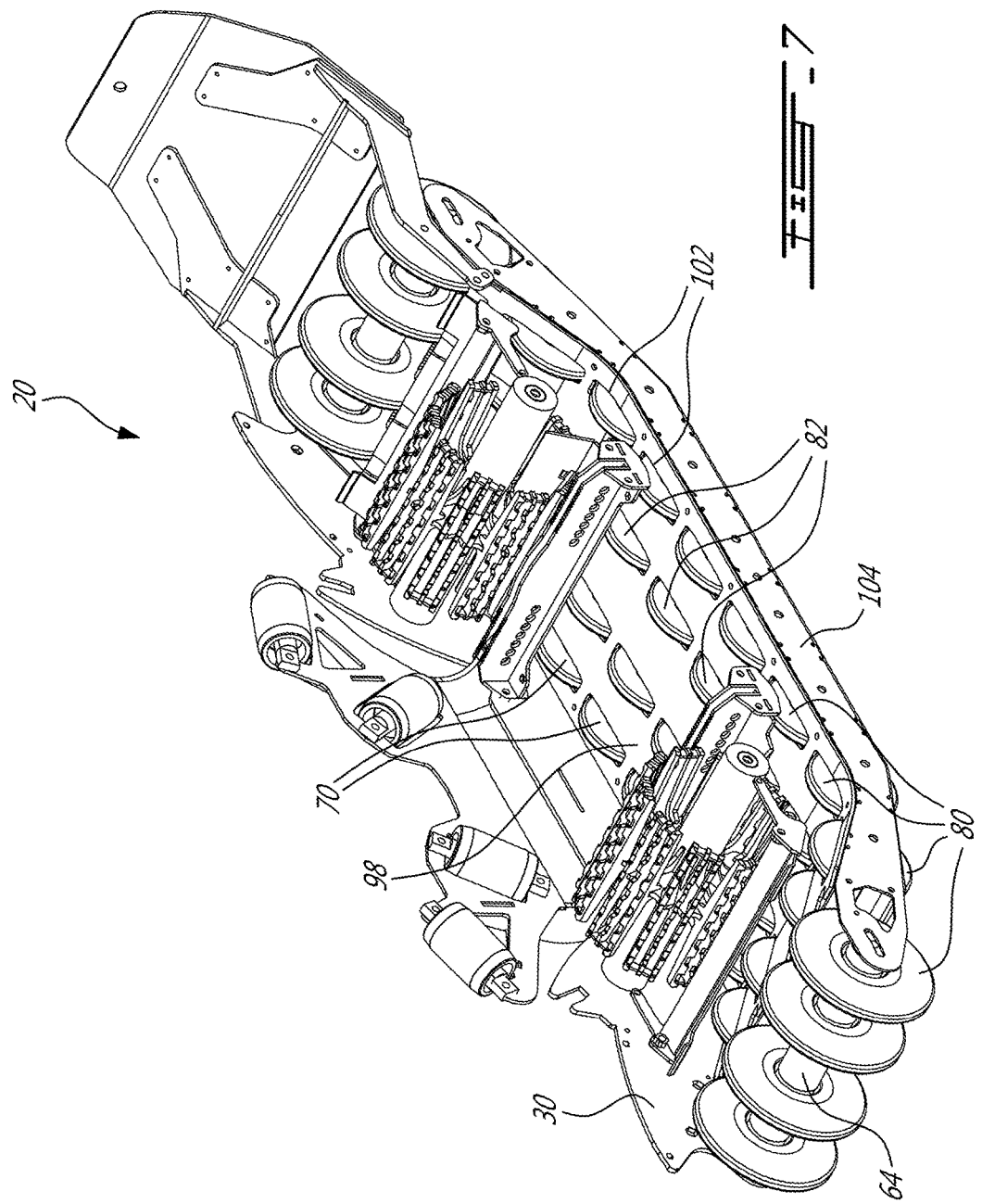
FIG. 7 is yet another oblique view of the track assembly of FIG. 1, with other components removed.
Figure 8:
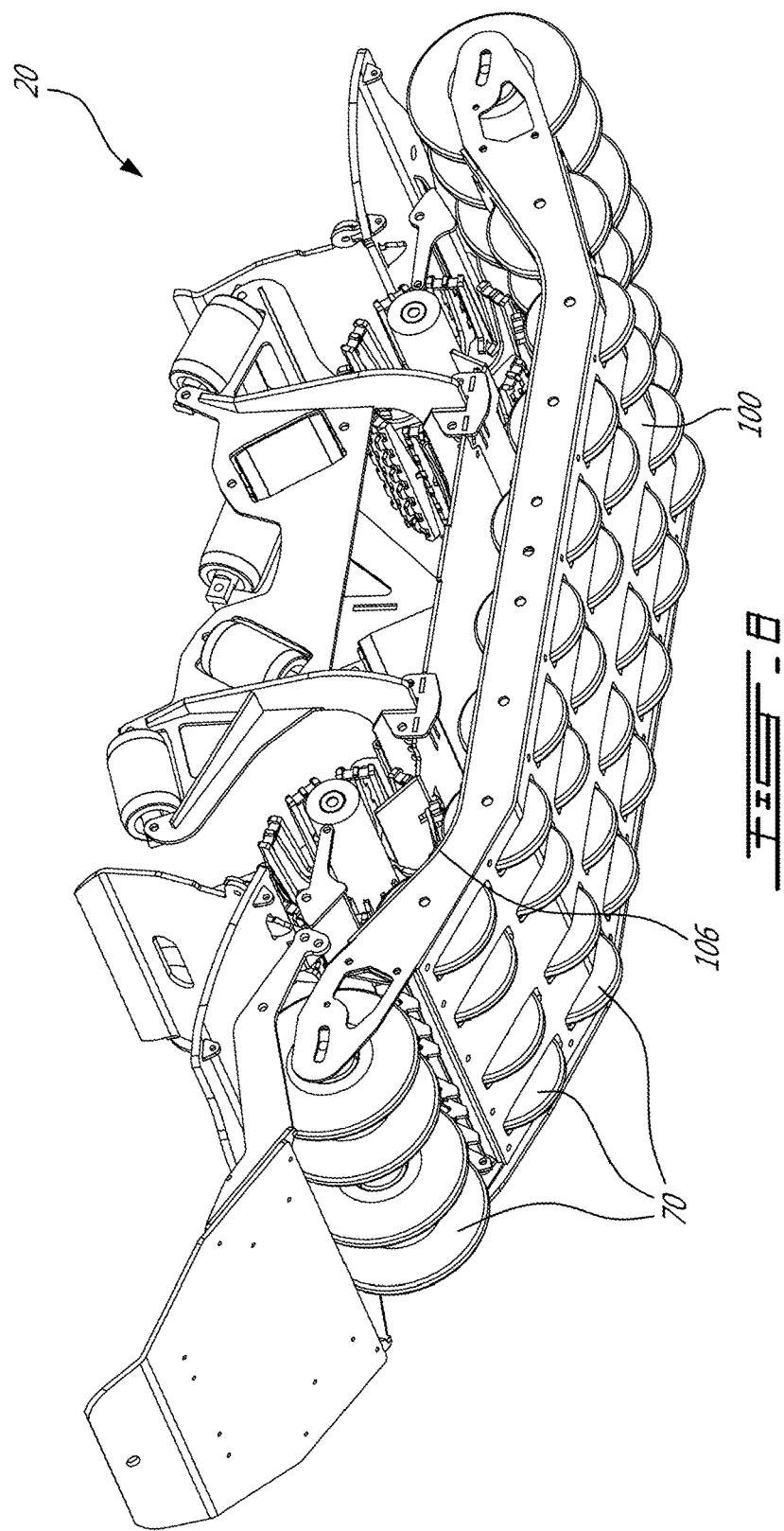
FIG. 8 is another oblique view of the track assembly of FIG. 1, with other components removed and taken from a different angle of view.

Referring to FIGS. 4, 7 and 8, an upper sliding surface 98 and a lower sliding surface 100 are also mounted to the frame structure 26. In this particular embodiment, the upper sliding surface 98 and the lower sliding surface 100 are provided in the form of sheet material provided with apertures 102 designed to snuggly allow the track rollers 70 to protrude therethrough and reach the track 22. The sliding surfaces 98, 100 are offset from the web 24 of the track 22 by a spacing distance associated to the thickness of the guiding members 84, to avoid interference therewith. It was found that the sliding surfaces 98, 100 can address the issue of potential agglomerations of ice which could otherwise jam the assembly when used in snow. In this specific embodiment, sliding surface plates 104, 106, shown in FIGS. 7 and 8, are mounted internally to the side plates 28, 30, and the sliding surfaces 98, 100 are provided in the form of sheets of low-friction and sturdy material, such as ultra-high-molecule-weight polyethylene, which are fastened at each end to corresponding edges of the sliding surface plates 104, 106.

Referring to FIGS. 3, 4 and 9, it can be seen that in this embodiment, the cavity between the sheets bearing the sliding surfaces 98, 100, left around the track roller shafts 64 and between the middle portions of the track rollers 70, is filled with a filler 108 which significantly limits the quantity of snow or ice which can penetrate between the sheets bearing the sliding surfaces 98, 100. In this embodiment, the filler 108 is provided in the form of molded body having a shape specifically designed to fill the complex shape of the cavity. A rotomoulding process can be particularly suited for this purpose. It will be understood that in alternate embodiments, rather than being provided in the form of separate sheet material, the sliding surfaces can be directly provided as corresponding surfaces of a molded body filler, for instance.

Referring back to FIG. 2, the track assembly 20 can be seen to further include two spaced-apart abutment plates 112, extending above the track 22, on a respective one of the opposite ends 42, 44 of the track assembly 20, in the general area over a respective one of the end roller shafts, and between the first and second side plates 28, 30. It also includes a partition 114, best seen in FIG. 3, extending between both drive gears 52. The abutment plates 112, and partition 114 protect the track 22 in a manner to reduce the flow rate of granular material which comes into contact with the track 22 and the drive gears 52 during operation.

Referring to FIGS. 3 and 4, the illustrated embodiment further includes an arctuate slide surface 110 provided between the partition 114 and the tire area 18. The arctuate slide surface 110 is adapted in shape to the contour of the tire, though slightly offset therefrom by a spacing distance, and can address the issue of potential ice buildup underneath the tire.

As it can be seen from FIG. 4, the tire area 18 and the drive gears 52 are external to track 22. The web 24 of the track 22 is wounded around the track rollers 70 while the tire area 18 and the drive gears 52 are located outside the closed loop defined by track 22.

In this embodiment, the track 22 is made of an elastomeric material and has an outer surface for contact with the ground and an inner surface. As best seen in FIG. 3, the outer surface is provided with transversal lugs 116 forming a tread 56 mates with the apertures in the outer wall of the drive gears 52 to engage therewith. More particularly, in the embodiment shown, the drive gears 52 meshingly engage with the equidistant transversal lugs 116. However, it is appreciated that in an alternate embodiment (not shown), the track 22 can be provided with equidistant longitudinally spaced-apart openings separated by bridging webs for engagement with the drive gears 52.

Moreover, referring back to FIG. 1, the abutment plates 112 cooperate with abutment members 118a, 118b, 118c in this specific embodiment, which can be provided as part of the track system 10 and mounted to the vehicle 12, to limit the rotating freedom of the track assemblies 20 around the tire axis. In this embodiment, two abutment members 118a, 118b are mounted to the suspension springs of each one of the rear wheels, one in the front and one in the back thereof. In this specific case, the abutment members can be lengthwise spaced apart from the tire by about 6 to 10 inches, and vertically spaced from the level of the bottom of the tire by between 10 and 12 inches, for instance. Still referring to the embodiment shown in FIG. 1, only one abutment member 118c is mounted adjacent each one of the front wheels of the vehicle 12, directly to the frame of the vehicle, and a retention chain 120 is used in lieu of an abutment member to limit the forward rotation of the track assemblies 20 mounted to the front wheels of the vehicle 12.

Referring to FIG. 2, in this embodiment, the track assemblies 20 also include an anti-diving flap 122 secured to the frame structure 26 and extending from one end 44 of the track assembly 20. When mounted to the vehicle 12, as shown in FIG. 1, the anti-diving flap 122 is oriented in a direction which is outward relative to the vehicle (i.e. the front end if the front axle or the rear end if the rear axle). More specifically, the anti-diving flap 122 has a flat body 123 which extends obliquely, both longitudinally and upwardly, from a corresponding end of a corresponding endless track. The anti-diving flap further has two structural arms 125, 127 which firmly hold the flat body 123 in its position relative to the endless track, and which both extend around the endless track, on a corresponding side thereof, to be secured to the frame 26 of the track assembly 20. In this embodiment, each structural arm is secured to a corresponding side plate. Referring to FIG. 4, the flat body 123 has an inner edge 129 and a tip. The inner edge 129 is positioned close to the outer surface of the endless track, adjacent a corresponding end roller. The vertical position of the inner edge 129, taken when the track assembly lays on a flat, horizontal surface, is located between the vertical position of the axis of the corresponding end roller, and the upper edge of the end roller. The flat body of the anti-diving flap has approximately the same width as the endless track belt. The length of the flat body is small compared to the length of the endless track belt.

It will be noted that in this embodiment, the angle of inclination of the flat body 123 is adjustable. More specifically, in this embodiment, the structural arms 125, 127 are secured to corresponding side plates via two threaded fasteners (not shown) which engage corresponding bores in the structural arms. One of these bores is located at an intermediary location along the structural arm and is a pivot bore 131. Two other bores 133, 135 are provided at an end of each structural arm 127, 125. A user can select one of two angles of inclination by selecting one of these two other bores 133, 135 into which to engage the other threaded fastener. This is done by pivoting the structural arms around the pivot bore 131 using the corresponding fastener as a hinge, until the selected one of the two other bores 133, 135 is aligned with a corresponding threaded aperture in the side plate.

Moreover, the track assemblies 20 in this embodiment also include two deflectors 124, 126, one extending upright from the abutment plate 112 at the rear of the tire area 18, and the other one extending upright from the abutment plate 112 at the front of the tire area 18. In this embodiment, the deflectors 124, 126 are mounted to the side plates 28, 30 in a manner that they can be pivoted out of longitudinal alignment of the tire area 18 for mounting or unmounting the tire from the track assembly. In FIG. 2, the deflector 126 is shown in the pivoted configuration, out of longitudinal alignment with the tire area 18, and the deflector 124 is shown extending upright from an abutment plate and leaning against the tire area 18, ready for use.

Referring to FIG. 1, in this embodiment, each track assembly 20 is mounted to a corresponding wheel via a corresponding tension attachment 124 which allows to apply a tension between the track assembly 20 and the wheel axis during use, which assists in maintaining the engagement of the tire with the drive gears 52. In this particular illustrated embodiment, the tension attachment 124 includes a turnbuckle 128 mounted between a rotary adapter 126 mounted directly to the hub of the wheel and an outer side plate of the track assembly 20. The turnbuckle 128 is tightened at installation to slightly compress the tire against the drive gears 52. A satisfactory amount of compression can be of between ¼" and ⅛" for a 31" tire, for instance. As will be understood by persons of ordinary skill in the art, it is preferred to use a turnbuckle 128 which has a longitudinal slide portion, which allows the turnbuckle to yield under compression while functional to apply strict tension at its position of fullest extension. In an alternate embodiment, the tension attachment can include a cable rather than a turnbuckle, for instance. In this embodiment, for additional retention, inner retention chains are also used, connected between the inner side plate of the track assembly 20 and the axle of the corresponding wheel, to also maintain tension resistance on the internal side of the tire and address potential unintentional exiting of the tire from the tire area during extreme circumstances.

Figure 5:
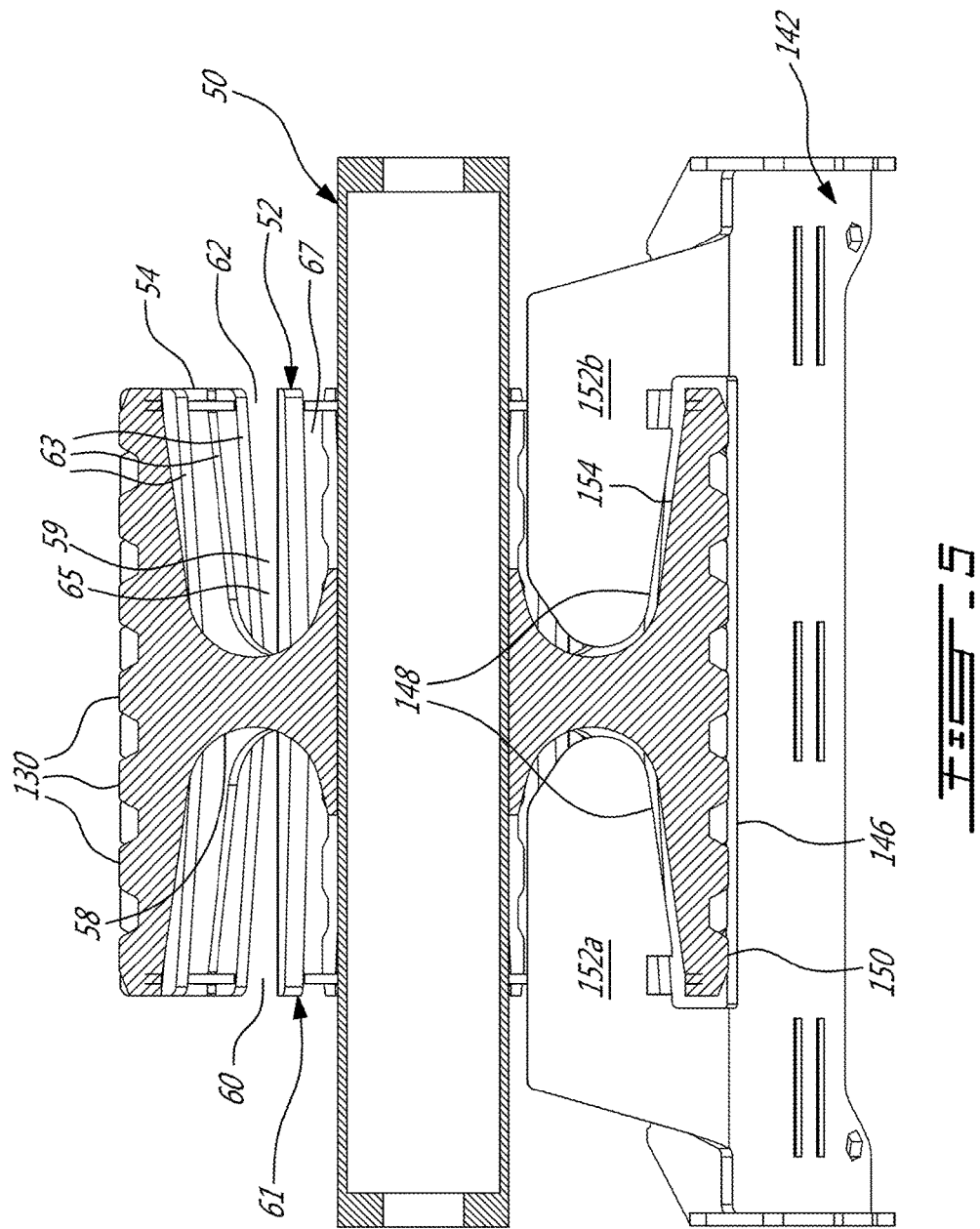
FIG. 5 is a cross-sectional view taken along lines 5-5 of FIG. 4.

Referring now to FIGS. 3 and 5, it will be seen that drive gears 52 have an apertured outer wall 54 in the shape of a cylinder with two spaced-apart open ends 60, 62 leading to a hollow 59, a shaft 50, and a plurality of elongated and substantially regularly circumferentially interspaced traction bars 63 forming the apertured outer wall 54. In other words, the traction bars 63 are arranged in a circle around the drive shaft 50. The traction bars 63 define the cylindrical shape of the drive gears 52 and extend substantially parallel to the shaft 50. The traction bars 63 are divided in equidistant traction bar units 61 wherein each unit 61 includes three traction bars 63, spaced-apart from one another. Each traction bar 63 of one unit 61 are connected at their ends. The apertures are in the form of slots 67 formed between traction bars 63 of a same unit 61, and channels 65 defined between adjacent units 61. The channels 65 between two consecutive traction bar units 61 are larger than the slots 67 between two consecutive traction bars 63 within one traction bar unit 61. The apertures are shaped for evacuating granular and liquid materials such as snow, sand, gravel, mud, ice, and the like from the tire and the track 22 inside the hollow 59 of the drive gears 52 and then out the two open ends 60, 62 of the drive gears 52. The granular and liquid materials are extruded inside and then outwardly of the drive gears 52 to reduce slippage and congestion of drive gears 52. In the embodiment shown, the ends of the traction bars 63 are unattached to the shaft 50.

The traction bars 63 are connected to the shaft through a radial support 58 which extends transversally centrally of the traction bars 63 in this specific embodiment. The radial support 58 maintains the elongated traction bars 63 in a radially spaced-apart relationship with the shaft 50. In alternate embodiments, the radial support can be located laterally, rather than centrally, forming only one open end instead of two, for instance. In an alternate embodiment, spaced-apart rods can attach the ends of the traction bars 63 to the shaft 50 while still providing sufficient opening from applications for use in sand, for instance. It is appreciated that the number and configuration of traction bars 63 and traction bar units 62 can vary.

As mentioned above, the drive gears 52 are located respectively forwardly and rearwardly of the tire area 18, and the traction bars 63 are adapted for receiving traction from the tire 26. In the operative configuration, the tire is seated against both two drive gears 52.

For reduced slippage during rotational frictional engagement with the tire, an outer edge of the traction bar 60 includes a plurality of lugs 130 integrally formed and separated by indentations, i.e. a plurality of projections that help to provide traction. In a traction bar unit 61, two successive rows of lugs 130 are arranged in a staggered relationship to promote traction. The lugs 130 define the tire contacting surface of the drive gears 52.

In this embodiment, the traction bar units 61 cooperate with transversal lugs 116 of the track 22 for propelling the vehicle 12. More particularly, the traction bar units 61 are in driving engagement with the lugs 116, i.e. consecutive transversal lugs 116 are inserted between consecutive the traction bar units 61 and apply pressure to the latter to rotate the track 22. The traction bar units 61 are spaced from one another so that the distance between two consecutive traction bar units 61 spans the distance separating an integer multiple of transversal lugs 116, in a meshing engagement, in such a way as to drive the track 22.

Referring to FIG. 4 each one of the drive gears 52 can be seen to form a generally wedge-shaped space 132 between its outer surface and the upturned portion of the track 22, toward the nearest end roller shaft 68, 66. It was found that when using the system in snow, snow tended to fill this wedge-shaped space 132 and then tend to turn to ice under pressure, imparting an undesired stress to the components. In this embodiment, this is addressed by way of a shield 134 provided here in the form of an elongated plate 136 as best seen in FIGS. 3 and 6. The elongated plate 136 is mounted to and extends between the two side plates 28, 30, and can be understood to bridge an entry gap leading to the wedge-shaped space 132. More specifically, in this specific embodiment, the elongated plate 136 is combined with a somewhat V-shaped plate 138 which provides additional mechanical resistance. Moreover, a free end 140 of the V-shaped plate 138 is closely aligned with an external surface of the track 22 and acts as what will be referred to herein as a shaver, i.e. to 'shave' incoming snow on the track from the track and onto the elongated plate 136, further reducing the amount of snow penetrating into the wedge shaped space 132, and thence against the drive gears 54.

As can be seen in FIG. 3, two transversal beams 142, 144 are provided in this embodiment, mounted to and extending transversally between the two side plates 28, 30, vertically between the track 22 and the tire area 18, and longitudinally between the two drive gears 52. These transversal beams 142, 144 form a structure which is used in this embodiment for a variety of purposes. For instance, the transversal beams 142, 144 receive the partition 114 and downwardly extending extensions of the actuate slide surface 110 in this embodiment. Moreover, as can be better seen in FIG. 5, the transversal beam 142 include portions which act as an external scraper 146 for the drive gear 52, and an internal scraper 148 for the drive gear 52.

More specifically, an edge of the transversal beam 142 is closely aligned with the radial position corresponding to the external surface 150 of the drive gear 52 in a manner to address any ice buildup thereon. Furthermore, two portions 152a, 152b of the transversal beam 142 project radially inwardly, and axially inwardly into the open ends 60, 62 of the drive gear 52 and have a shape closely adjusted to scrape any ice buildup forming on the interior surface 154 of the cylindrical outer wall 54.

In this particular embodiment, it will be noted as shown in FIGS. 4 and 6 that an edge 156 of the elongated plate 136 forming the shield 134 projects laterally from the V-shaped plate 138 and is closely aligned with the external surface 150 of the drive gear 52, forming a second external scraper 158. Experiments demonstrated that using two external scrapers instead of one provided better results in snow. More specifically, the two external scrapers can provide good results when they are significantly tangentially interspaced from one another, such as over 100° for instance. In this particular embodiment, the two external scrapers 146, 158 are tangentially interspaced by about 150°, which provided satisfactory results in many snow conditions.

Figure 12:
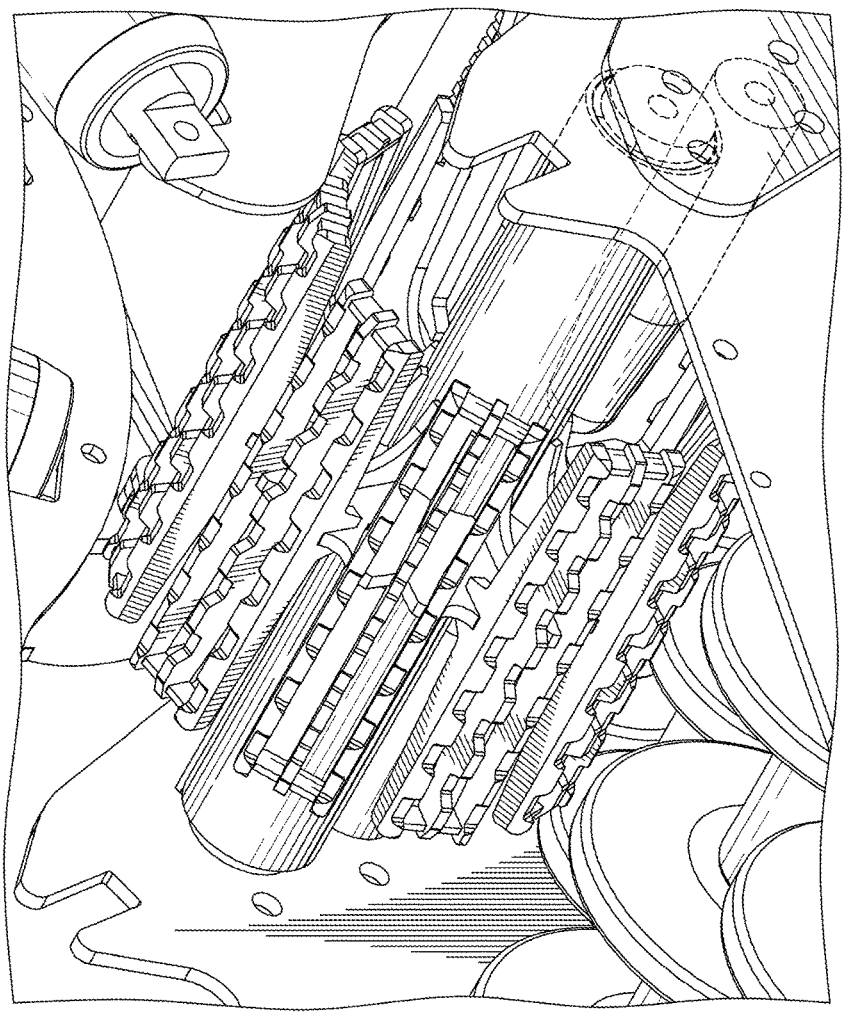
FIG. 12 is an oblique view of a portion of the track assembly of FIG. 11 enlarged to show detail.

Referring back to FIG. 5, the projecting portions 152a, 152b of the transversal beam 142 also act as extrusion members for pushing the granular material outside the drive gears 52 through the open ends 58, 60. In an alternate embodiment, stems affixed to the side plates can be used in lieu of the projecting portions, for instance, such as illustrated in FIG. 12. It will be understood that if the drive gear 52 has only a single open end, only a single extrusion member protruding into the drive gear through that open end can be used instead of two.

As mentioned above, the hollow 59 of the drive gears 52, the channels 65 and the slots 67 cooperate with the extrusion members to allow the evacuation of granular and liquid materials such as snow, sand, gravel, ice, and the like from the vehicle tire and the track 22 into the hollow 59 of the drive gears 52 and then out the open ends 60, 62. The granular and liquid materials are extruded radially into and then axially outwardly of the drive gears 52 to reduce slippage and congestion of drive gears 52.

In the illustrated embodiment, the track assembly 20 is provided with an external gearing, i.e. the drive gears 52 are located externally of track 22. The track 22 has a plurality of equidistant transversal lugs 116, which ensure a positive engagement with the traction bars 63 provided on the outer circumference of drive gears 52. In operation, the tires of the vehicle 12 are in rotational frictional engagement with the drive gears 52 and the rotational movement of the wheels is transmitted to the drive gears 52. The drive gears 52 are in meshing, gearing engagement with the track 22 and transform their rotational motion into linear motion of the track 22.

As it will be easily understood by one skilled in the art, the drive gear 52 can cooperate with either transversal lugs 116 of the track 22 or with bridging webs, whichever the track 22 includes.

Thus, the engine of the motorized vehicle 12 drives the tires into rotation. The tires drives both drive gears 52 in rotation by frictional engagement between an outer surface of the tire and the elongated traction bars 63 of the drive gears 52. The drive gears 52 drive the track 22 in rotation by the meshing engagement of the elongated traction bars 63 with the transversal lugs 116 of the track 22. It is further to be understood that the transversal lugs 116 on the external surface 38 of the track 22 also form a tread which exerts a positive mechanical connection with the underlying ground surface that contributes to propel the motorized vehicle 12.

Referring back to FIG. 2, the track assembly 20 further includes two spaced-apart lateral tire supports 160, 162 including tire rollers 74 for laterally engaging the tire 26 in the tire area 18 therebetween. The lateral tire supports 160, 162 are mounted externally of the track 22. The distance between the two lateral tire supports 160, 162 is associated to the width of the tire area 18. In the embodiment shown, the lateral tire supports 160, 162 have an arctuate shape associated to a corresponding portion of the tire. However, it will be appreciated that the shape can vary in alternative embodiments. The lateral tire supports 160, 162 ensure that the tire remains in the tire area 18 when mounted thereto and addresses side slippage from the track assembly 20. In this embodiment, the tire rollers 74 are rotatably mounted in apertures defined in the lateral tire supports 160, 162 and are oriented in a substantially radial configuration relative to the wheel axis 46. They are positioned to abut the lateral faces of the tire when the latter is in the tire area 18 with a limited amount of friction and simultaneously guide the tire to prevent side slippage. In the embodiment shown, each one of the lateral tire supports 160, 162 include four rollers 72; however, it is appreciated that in alternative embodiments, the lateral tire supports 160, 162 can include more or less rollers, an example being shown in FIG. 5.

In this embodiment, it will be noticed that the lateral tire supports 160, 162 are mounted to the transversal beams 142, 144, which are provided with a plurality of apertures allowing a pin to be selectively inserted in a corresponding aperture and through the lateral tire supports, which allows to adjust the distance between the lateral tire supports 160, 162 by sliding the lateral tire supports 160, 162 along the transversal beams 142, 144 and the locking them into place with the pin (not shown).

In this embodiment, the track assembly 20 is adapted to receive tires of various diameters, ranging between 31 and 35 inches in this specific case.

As it will be easily understood by one skilled in the art upon inspection of FIGS. 2 and 3, the track rollers 70 on the end roller shafts 66, 68 can be moved, e.g. to tension the track or replace the track, by moving the end roller shaft 66, 68 along an arctuate aperture 164 defined in the side plates 28, 30.

The particular configuration of the end roller shafts 66, 68 make them not well adapted to the use of a sliding surface such as 98, 100. In this embodiment, the issue of potential ice buildup around the end roller shaft 66, 68 is addressed by the presence of a end beams 166 extending between the two side plates, between the end roller shafts 66, 68 and the adjacent (next to last) track roller shaft and having a plurality of scraper members 168 mounted thereon, such as shown in FIG. 9. The scraper members 168 extending from the end beam 166 at transversal positions corresponding to the spacings 86, 88, 90 (see FIG. 6) between the track rollers 70 of the end roller shaft 68, and which act to break occurrences of ice buildup on the shaft 68. The radial position of the tip 170 of the scraper members 168 is selected for the scraper members 168 to be out of the movement path of the shaft 68 when it is moved along the arctuate apertures 164 in the side plates 28, 30. Moreover, the radial position of the tip 170 of the scraper members 168 is selected to be sufficiently close to the shaft 168 to clear a sufficient depth of snow or ice to allow for the thickness of the guiding members 84 of the track 22, thereby allowing the track 22 to move freely.

Figure 10:
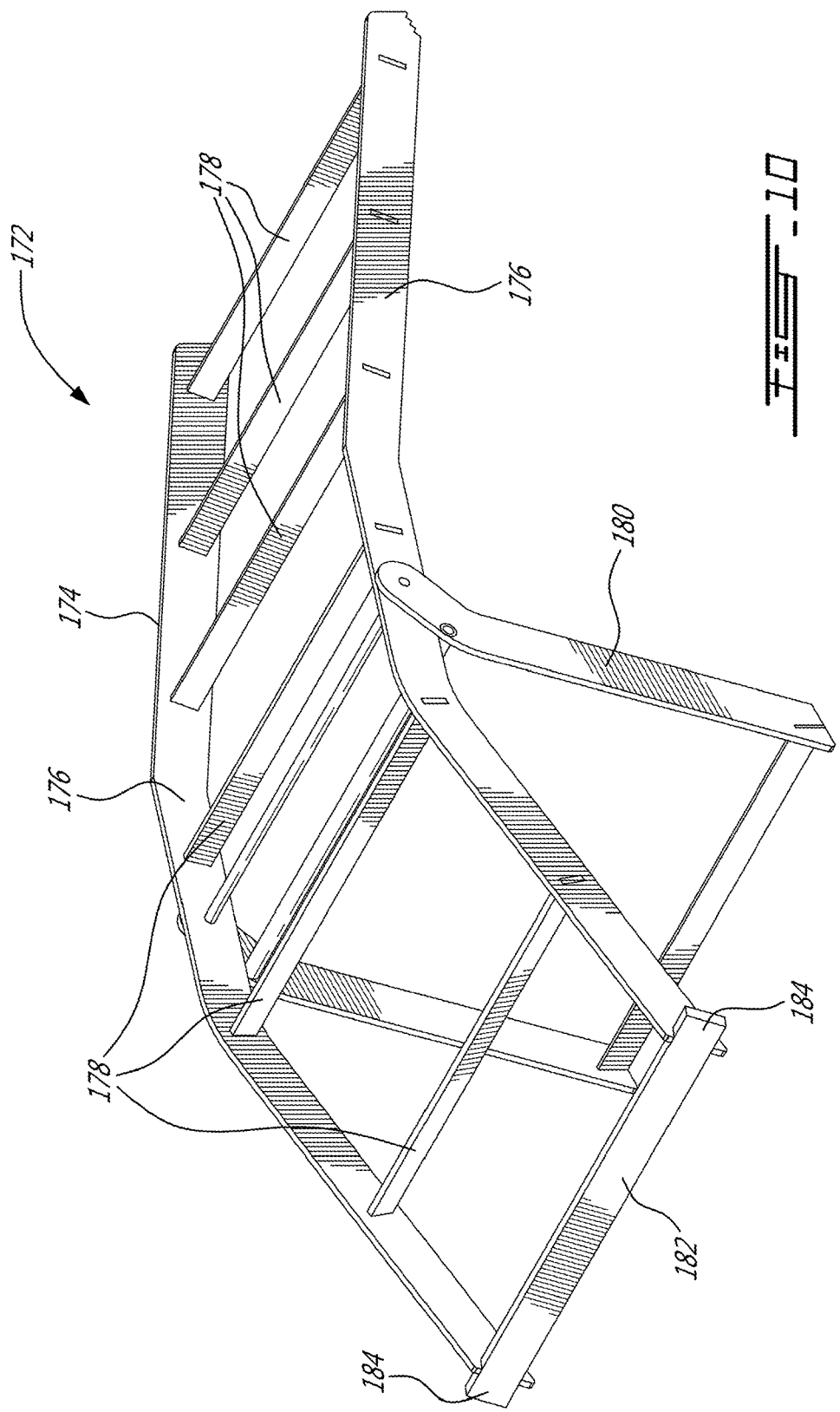
FIG. 10 is an oblique view of an example of a ramp which can be used to mount the tires into a tire area of the track assemblies.

The track assemblies 20 can be provided as a kit with ramps, an example being shown in FIG. 10, for mounting and dismounting the track assemblies 20 to the tire. Referring to FIG. 10, there is shown an embodiment of a ramp 172 for mounting and dismounting the track assemblies 20. The ramp 172 has a frame 174 with two longitudinal bars 176, spaced-apart from one another, and a plurality of transversal bars 178, spaced-apart from one another and extending between the two longitudinal bars 176. The transversal bars 178 define a surface which supports the tire when displaced thereon for climbing and descending the wheel on the track assembly 20. The ramp 172 also includes a pivotable leg 180 which stabilizes the ramp 172 when secured to one of the track assemblies 20. The last one of the transversal bars 178 of the ramp 172 is an attachment bar 182 which can be specifically adapted to be engageable with one of the channels 65 in the drive gear 52 of the track assembly 20, between two adjacent traction bar units 61. When engaged in the channel 65, the attachment bar 182 secures the ramp 172 to the track assembly 20 and prevents rotation of the drive gear 52. In this embodiment, the attachment bar 182 projects outwardly in the transversal orientation and forms attachment extensions 184 which are engageable in respective slots 186 defined in the first and second side plates 28, 30 for further attaching the ramp 172 to the track assembly 20 and locking the rotation of the drive gears 52. In the embodiment shown, slots 188 are provided on each side of the lateral tire supports 160, 162 for either attaching the ramp 172 to the front or rear sides of the track assembly 20. It is appreciated that the shape of the ramp 172 and the attachment mechanism can differ from the one described above and shown in the figures in alternate embodiments.

The track assemblies 20 can be mounted to the tires of a four wheel drive vehicle as follows: two first track assemblies 20 are laid on the ground, either forwardly or rearwardly of the vehicle 12, close to the respective front or rear set of wheels and longitudinally aligned therewith. For instance, the track assemblies 20 can be first mounted to the rear vehicle wheels. Thus, the track assemblies 20 are laid on the ground rearwardly of the rear vehicle wheels in alignment therewith. The deflectors 124, 126 are pivoted out from alignment with the tire area 18. A ramp 172 is attached to each one of the track assemblies 20. The ramp 172 extends between the vehicle wheels and the track assemblies 20. Then, the vehicle 12 is displaced rearwardly for the vehicle wheels 26 to climb the ramps 86 and drop into the operative position in the vehicle track assemblies 20. Then, the deflectors are pivoted back into their operative position, the ramps 86 are removed, the track assemblies 20 are secured to the vehicle 12.

The other two track assemblies 20 are laid on the ground forwardly of the front vehicle wheels and aligned therewith and their deflectors are pivoted out from alignment with the tire area. Ramps 86 are attached to each one of the track assemblies 20. The ramps 86 extend between the vehicle wheels 26 and the track assemblies 20. Then, the vehicle 12 is displaced forwardly for the vehicle wheels to climb the ramps 86 and drop into the operative position in the vehicle track assemblies 20. Then, the ramps 86 are removed and other suitable operations are performed as described above.

It is appreciated that the front track assemblies 20 can be mounted to the vehicle 12 first, prior to the rear track assemblies 20. It also appreciated that in an alternate method, the track assemblies 20 can be positioned under the vehicle and the vehicle can climb onto all four track assemblies in a single step, which can be done by previously removing two of the anti-diving flaps and subsequent mounting of these anti-diving flaps, for instance.

For dismounting the track assemblies 20, the above identified steps are reversed.

It can be understood that in the above method, the wheels of the vehicle 12 remain mounted to the hubs during the installation.

As people skilled in the art will understand, motorized vehicles 22 provided with four endless track assemblies 20, can be used for a wide range of operations and terrains, while being highly mobile and offering good running performance. The endless track structure maintains an adequate configuration over a variety of surfaces.

As it will be further understood by those skilled in the art, the motorized vehicle 12, equipped with the track assemblies 20, may be viewed as a snow vehicle since it may be used on snow similarly as conventional snow vehicles such as snowmobiles, for example. The wide supporting footprint of the track assemblies 20 is an important factor allowing satisfactory performance. However, the absence of sliding shoes (skis) allows the use of the motorized vehicle 12 on harder surfaces without the usual drawbacks of tracked vehicles.

Figure 11:
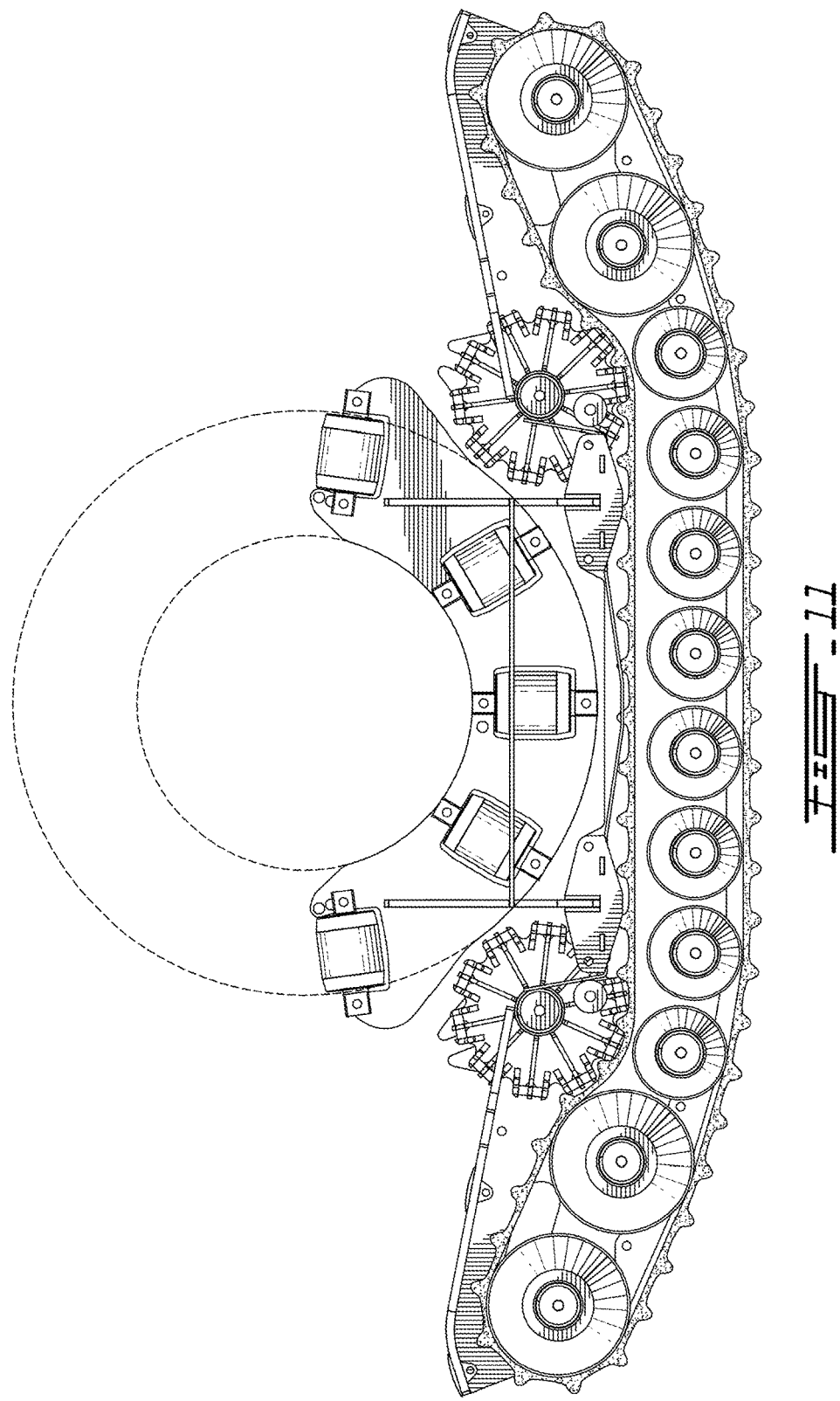
FIG. 11 is a cross-sectional view of an alternate embodiment of a track assembly.

An example of an alternate embodiment is shown in FIGS. 11 and 12. It will be noted that in this alternate embodiment, the number of tire rollers, their position, and their configuration, is different from the embodiment described above and illustrated in FIGS. 1 to 9. Moreover, this alternate embodiment omits some components or features described in relation with the previous embodiment.

As can be seen from the above, the examples described above and illustrated are intended to be exemplary only. The scope is indicated by the appended claims.

The invention claimed is:

1. A track system comprising four track assemblies each mounted to a corresponding driving axle of a vehicle to receive driving power therefrom, each track assembly having:
   a frame structure;
   a plurality of transversally-oriented track roller shafts mounted to the frame structure, parallel to one another and interspaced from one another, including two end roller shafts each at a corresponding opposite longitudinal end;
   an endless track belt having an outer surface and an inner surface, the endless track belt being longitudinally oriented and wrapping the track roller shafts;
   an anti-diving flap having a flat body protruding upwardly and longitudinally from one longitudinal end of the endless track belt, the anti-diving flap having two structural arms, each structural arm extending around the endless track belt on a respective transversal side thereof and being secured to the frame structure;
   wherein the anti-diving flaps of the track assemblies which are secured to a front drive axle of the vehicle extend forwardly from a forward end of the corresponding endless track belt and the anti-diving flaps of the track assemblies which are secured to a rear drive axle of the vehicle extend rearwardly from a rearward end of the corresponding endless track belt.

2. The track system of claim 1 wherein the flat body of the anti-diving flap has an inner edge adjacent the endless track belt, the inner edge having a vertical height being at least equal to a vertical position of the rotation axis of the adjacent end roller shaft.

3. The track system of claim 2 wherein the inner edge has a vertical height between a vertical position of the rotation axis of the adjacent end roller shaft and an upper end of track rollers of the adjacent end roller shaft.

4. The track system of claim 1 wherein the flat body of the anti-diving flap has approximately the same width as the endless track belt.

5. The track system of claim 1 wherein the length of the flat body is small compared to the length of the endless track belt.

6. The track system of claim 1 wherein the frame structure includes two elongated side plates oriented parallel to each other and transversally spaced-apart from each other, the two side plates each having two opposite ends, each opposite end being associated to a corresponding longitudinal end of the track assembly.

7. The track system of claim 1 wherein the track assemblies are mounted to a corresponding drive axle of the vehicle via a corresponding tire of the vehicle.

8. The track system of claim 7 wherein each one of the track assemblies further has a tire area located centrally and above the frame structure, where a corresponding tire of the vehicle is to be received and rotated around a wheel axis; two parallel, transversally-oriented drive shafts, each received in the frame structure on a corresponding longitudinal side of the tire area, each having a rotatable drive gear having an apertured and generally cylindrical outer wall drivingly engaged with the track and having at least one open transversal end, the drive gears being collectively engageable with the tire in a manner that the drive gears collaborate in driving the track as the engaged tire rotates; two lateral tire supports mounted to the frame structure, each lateral tire support being positioned on a corresponding transversal side of the tire area and rotatably receiving a plurality of tire rollers aligned in a corresponding vertical plane to laterally engage a tire received in the tire area.

9. A track assembly having:
   a frame structure;
   a plurality of transversally-oriented track roller shafts mounted to the frame structure, parallel to one another and interspaced from one another, including two end roller shafts each at a corresponding opposite longitudinal end;

an endless track belt having an outer surface and an inner surface, the endless track belt being longitudinally oriented and wrapping the track roller shafts;

an anti-diving flap having a flat body protruding upwardly and longitudinally from one longitudinal end of the endless track belt, the anti-diving flap having two structural arms, each structural arm extending around the endless track belt on a respective transversal side thereof and being secured to the frame structure; and a tire area located centrally and above the frame structure, where a corresponding tire of a vehicle is to be received and rotated around a wheel axis; two parallel, transversally-oriented drive shafts, each received in the frame structure on a corresponding longitudinal side of the tire area, each having a rotatable drive gear having an apertured and generally cylindrical outer wall drivingly engaged with the endless track belt and having at least one open transversal end, the drive gears being collectively engageable with the tire in a manner that the drive ears collaborate in driving the endless track belt as the engaged tire rotates; two lateral tire supports mounted to the frame structure, each lateral tire support being positioned on a corresponding transversal side of the tire area and rotatably receiving a plurality of tire rollers aligned in a corresponding vertical plane to laterally engage said tire received in the tire area.

10. The track assembly of claim 9 wherein the flat body of the anti-diving flap has an inner edge adjacent the endless track belt, the inner edge having a vertical height being at least equal to a vertical position of the rotation axis of the adjacent end roller shaft.

11. The track assembly of claim 10 wherein the inner edge has a vertical height between a vertical position of the rotation axis of the adjacent end roller shaft and an upper end of track rollers of the adjacent end roller shaft.

12. The track assembly of claim 9 wherein the flat body of the anti-diving flap has the same width as the endless track belt.

13. The track assembly of claim 9 wherein the length of the flat body is small compared to the length of the endless track belt.

14. The track assembly of claim 9 wherein the frame structure includes two elongated side plates oriented parallel to each other and transversally spaced-apart from each other, the two side plates each having two opposite ends, each opposite end being associated to a corresponding longitudinal end of the track assembly, wherein each structural arm of the corresponding anti-diving flap is secured to a corresponding one of the side plates.

* * * * *